Oct. 25, 1932.  D. S. BARROWS  1,884,516
CUSHIONING MECHANISM
Filed Aug. 4, 1926   2 Sheets-Sheet 1
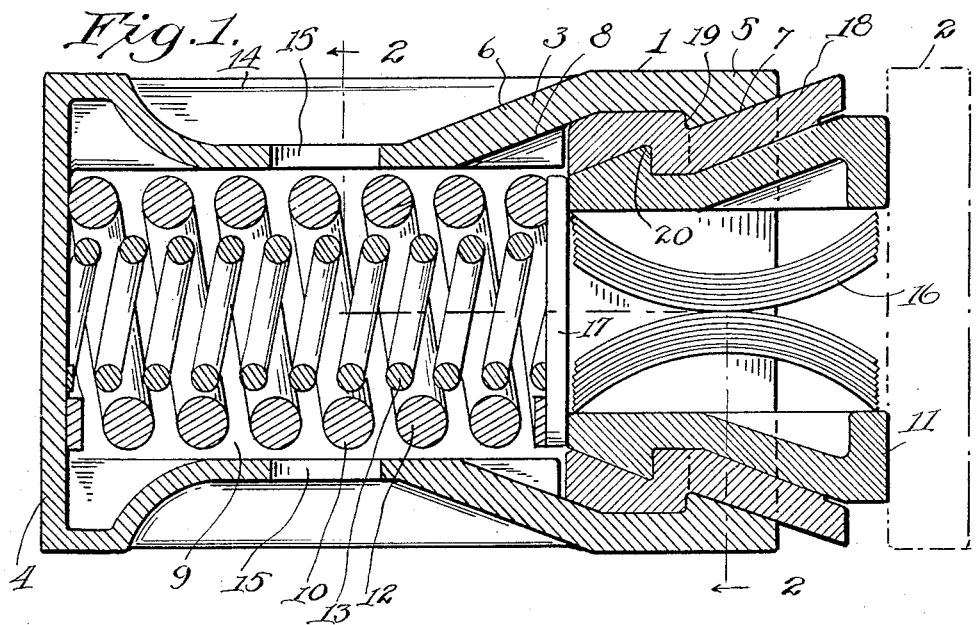
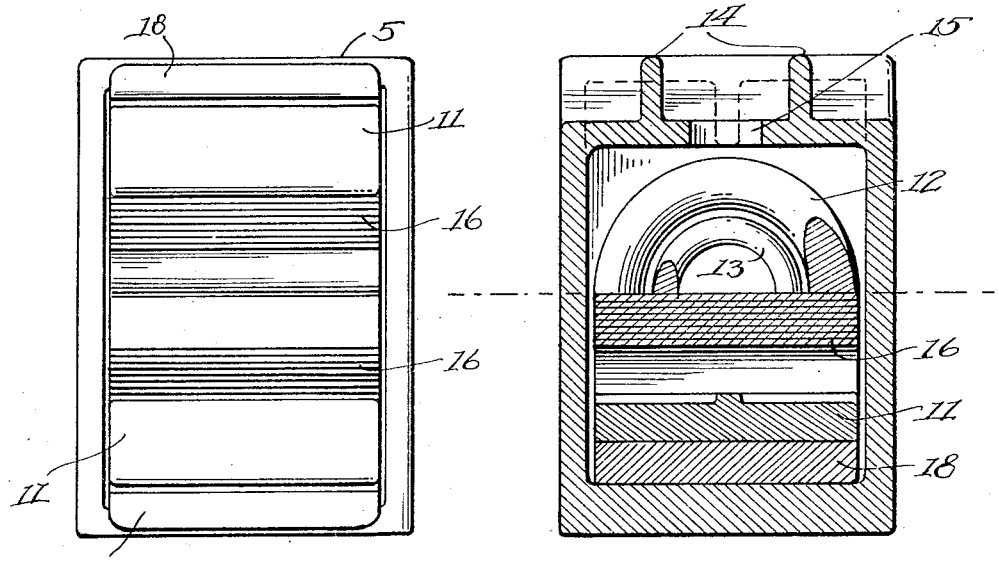
Inventor
Donald S. Barrows
his Attorney Oct. 25, 1932.  D. S. BARROWS  1,884,516
CUSHIONING MECHANISM
Filed Aug. 4, 1926  2 Sheets-Sheet 2

Inventor
Donald S. Barrows
his Attorney

Patented Oct. 25, 1932

1,884,516

UNITED STATES PATENT OFFICE

DONALD S. BARROWS, OF ROCHESTER, NEW YORK, ASSIGNOR TO THE GOULD COUPLER COMPANY, OF NEW YORK, N. Y., A CORPORATION OF MARYLAND

CUSHIONING MECHANISM

Application filed August 4, 1926. Serial No. 127,133.

This invention relates to cushioning mechanism and, more particularly, to a friction draft gear adapted for application to a railway car for receiving and cushioning draft and buffing shocks.

The principal object of my invention, generally considered, is the provision of a friction draft gear adapted for application to railway cars, said gear being so designed that an increase in capacity is effected together with a retention of smoothness of operation and longevity of service.

An object of my invention is the provision of a friction draft gear comprising a casing formed with a plurality of sets of inclined friction surfaces adjacent the open end thereof, said casing being adapted for receiving friction wedge blocks which are slidable longitudinally with respect thereto and are formed with cooperating friction surfaces thereon, provision being made for reducing the wear on the casing, if desired, by positioning wedge shoes or intermediate friction elements between said casing and friction blocks, said shoes being formed with friction surfaces engaging the friction surfaces on the casing and wedge blocks, repectively, and preferably having relative movement with respect to said casing and wedge blocks.

Another object of my invention is the provision of a friction draft gear especially adapted for application to railway cars, said gear comprising a friction barrel integrally formed with a double bell mouth for increasing the frictional area with respect to associated friction wedges, whereby the inclination of said friction surfaces may be increased for increasing the capacity of the gear.

A further object of my invention is the provision of a frictional cushioning mechanism especially adapted for use as a railway draft gear and comprising a friction casing closed at one end and open at the other, said open end being provided with a plurality of sets of inclined friction surfaces, said casing containing resilient means resisting inward movement of associated wedge blocks, separate resilient means urging said wedge blocks toward the friction surfaces adjacent the mouth of the casing and friction shoes disposed between the friction surfaces on the casing and wedge blocks, the inclination of the friction surfaces on the wedge blocks and the cooperating surfaces on the shoes being greater than the inclination of the friction surfaces on the casing and the cooperating surfaces on the shoes, whereby improvement in operation of the gear is effected.

Other objects and advantages of the invention relating to the particular arrangement and combination of the various parts will become apparent as the description proceeds.

Referring to the drawings illustrating my invention, the scope whereof is defined by the appended claims:

Figure 1 is a vertical longitudinal central section of one embodiment of my invention showing the cushioning mechanism in open or in release position.

Figure 2 is a cross sectional view on the line 2—2 of Figure 1 looking in the direction of the arrows.

Figure 3 is a right-hand end elevation of the form of my invention shown in Figure 1.

Figure 4:
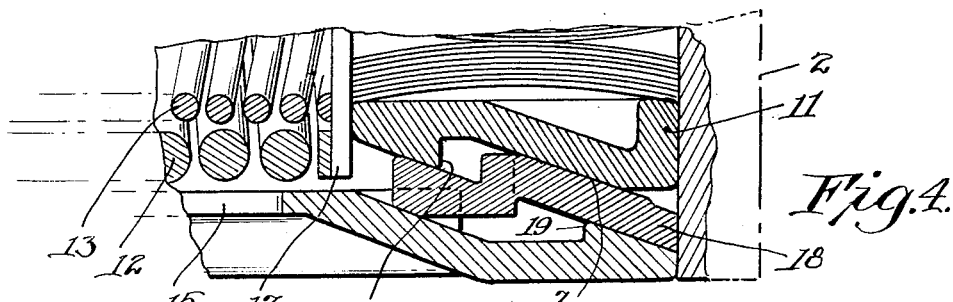
Figure 4 is a fragmentary view corresponding to Figure 1 but showing my draft gear or cushioning mechanism in closed or stressed position.

Referring to the drawings in detail, like parts being designated by like reference characters and first considering the embodiment of my invention illustrated in Figures 1 to 4, inclusive, there is shown a cushioning mechanism 1 especially adapted for use as a friction draft gear for railway cars and designed so that it will fit in a draft gear pocket of normal size. In Figure 1, the gear is shown associated with a rear follower 2 and is particularly adapted for use with the usual type of Farlow attachments embodying a horizontal yoke, a front follower, a supporting key for said front follower and connecting the same with the draft sills and another key serving for connecting the yoke with the coupler. The aforementioned parts, in addition to the draft gear and rear follower, are not shown because they are parts of a usual form of draft rigging with which my draft gear may be used although, it will be understood that, my gear is adapted for use with other forms of draft rigging or in other service, if desired.

The embodiment of my cushioning mechanism illustrated in the first four figures comprises a friction casing or barrel 3 closed at one end by a wall 4, which end, in the present embodiment, is illustrated as the front end although, as is obvious, my gear is adapted for use turned end to end, if desired. The open end of the gear is preferably formed with flaring or inclined walls 5 and 6, said walls providing a plurality or pair of sets of inclined friction surfaces 7 and 8. On account of this construction, the casing 3 is formed with, what is in effect, a double bell mouth which is larger than the remaining portion of the casing, which remaining portion is preferably decreased to a substantially square box portion 9 which serves for containing the resilient means 10 which resists inward movement of the pressure transmitting elements or friction wedge blocks 11. The casing 3, therefore, functions as a spring cage or housing 9 and a wedge friction shell 5, 6. In the present embodiment, the resilient means 10 is shown as comprising a pair of coil springs 12 and 13, the outer spring 12 being of greater capacity than the inner spring 13 and said springs being wound in opposite directions so that interference therebetween is minimized. The closed end of the casing 3 is preferably enlarged to the same size as the open end to provide a firm bearing with respect to the adjacent element of the draft rigging and longitudinal stiffening ribs 14 are preferably provided between the double bell shaped end and the closed end of the casing, as shown most clearly in Figure 2. Between the ribs 14, apertures 15 are preferably provided which serve to lighten the weight of the barrel 3 to permit the elimination of dirt therefrom, and provide openings for inspection of the springs 12 and 13.

The wedges or wedge blocks 11 are urged apart and pressed toward the friction surfaces 7 and 8 on the casing 3 by suitable resilient means which, in the present instance, comprises a pair of sets of spring plates 16, preferably curved longitudinally and disposed with their convex sides toward each other. A plate or intermediate follower 17 may be positioned between the inner ends of the wedge blocks 11 and the outer ends of the springs 12 and 13, said follower 17 thereby providing a firm bearing for the outer ends of the coil springs and serving to limit longitudinal movement of the plate springs 16.

Preferably positioned between the friction surfaces 7 and 8 on the casing 3 and the corresponding portions of the wedge blocks 11 are intermediate friction elements or wedge blocks or shoes 18, said wedge shoes preferably being slightly shorter than the friction blocks 11 and so arranged that, when in released position as in Figure 1, the inner ends of the wedge blocks and shoes are substantially in alinement while the outer ends of the wedge blocks 11 extend a substantial distance beyond the ends of the shoes 18. The outer faces of each wedge shoe 18 provides a plurality of similarly inclined friction surfaces engaging the corresponding friction surfaces 7 and 8 of the casing 3. On account of the friction surfaces 7 and 8 being stepped rather than continuous, shoulder portions 19 are formed on the friction casing 3 which interlock in corresponding depressions on the shoes 18 to limit outward movement of said shoes during normal operation of the gear. A similar interlocking engagement is effected between the shoulder portions 20 on the wedge blocks and corresponding depressions on the inner faces of the shoes 18, whereby outward movement of said wedge blocks during normal operation is limited.

The inclination of the inclined friction surfaces on the wedge blocks 11 and the engaging surfaces on the shoes 18 is preferably slightly greater than that of the inclined friction surfaces 7 and 8 on the casing and the engaging surfaces on the shoes 18. For example, in the present embodiment, the inclination of these friction surfaces on the shoes is twenty-three degrees with respect to the longitudinal center line of the gear while the inclination of the friction surfaces on the casing is only twenty-two degrees. The reason for this construction is to improve the operation of the gear and, particularly, the release thereof, it being apparent that the greater the inclination of the friction surfaces, the easier the gear will release. With the construction heretofore described, therefore, the release of the gear is effected first by the outward movement of the wedge blocks 11 with respect to the shoes 18 and upon engagement of the shoulders 20 thereon with the corresponding portions on the shoes, said shoes will finally be drawn to released position.

The operation of my cushioning mechanism or draft gear is as follows. When force is applied thereon, for example either buffing or draft force, relative movement is effected between the casing 3 and the follower 2, thereby first causing the wedge blocks 11 to move inwardly of the casing 3, on account of the inertia of the shoes 18 and the tendency for them to stay in place with the casing, straightening the springs 16 and compressing the springs 12 and 13, as will be understood. When the wedges 11 have moved until the follower 2 engages the ends of the shoes 18, said shoes then move with the wedges 11 until the gear is fully compressed as illustrated particularly in Figure 4. When the gear is released, the wedges 11 first move outwardly until the shoes 18 are picked up as will be understood.

Figure 5:
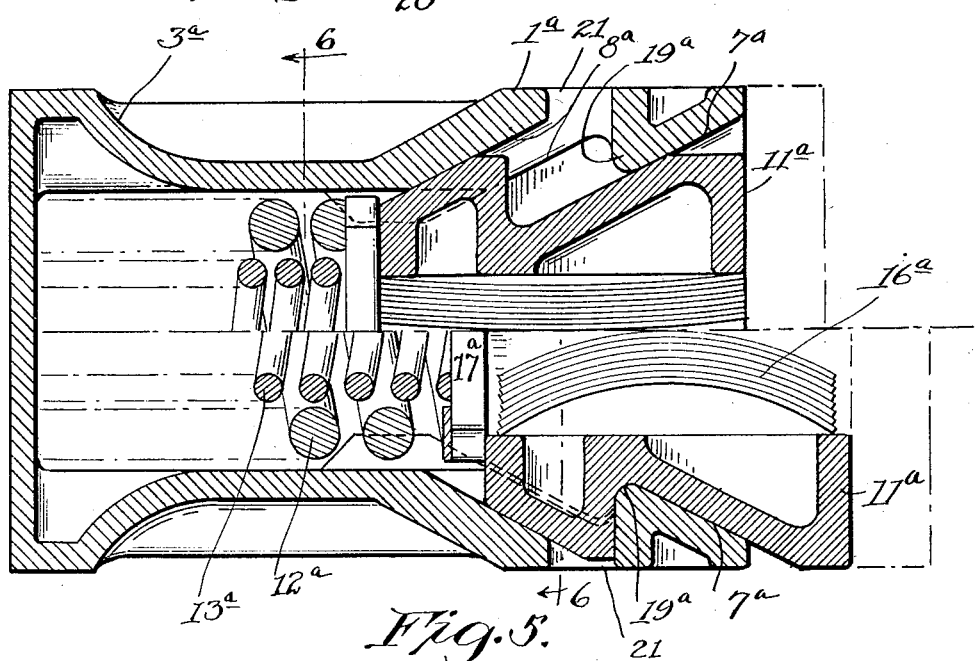
Figure 5 is a view corresponding to Figure 1 but showing another embodiment of my invention, the upper half, however, of said figure showing the gear in closed or stressed position.
Figure 6:
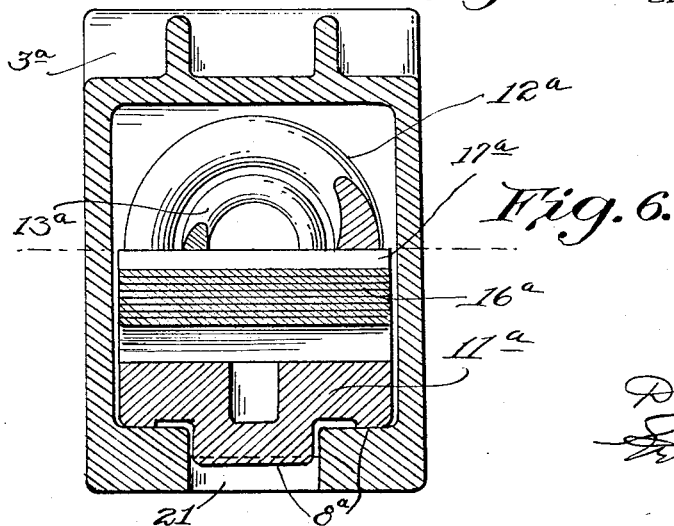
Figure 6 is a transverse sectional view on the line 6—6 of Figure 5 looking in the direction of the arrows.

Referring now to the modification of my invention illustrated in Figures 5 and 6, there is disclosed a gear $1^a$ comprising a friction casing $3^a$ formed with a double bell shaped mouth providing a pair of sets of friction surfaces $7^a$ and $8^a$ as in the previous embodiment. In the present instance, however, these friction surfaces are disposed at a greater angle than in the first embodiment, whereby the capacity of the gear is increased. Although I do not wish to be limited to the exact showing yet, for purposes of illustration, the angle of inclination between the friction surfaces $7^a$ and $8^a$ and the longitudinal axis of the gear is shown as twenty-eight degrees.

As in the first embodiment, wedge blocks $11^a$ are provided formed with double friction surfaces as are provided on the casing $3^a$. Movement of said wedges $11^a$ longitudinally of the casing is restrained by resilient means such as coil springs $12^a$ and $13^a$, an intermediate follower $17^a$ being provided between the springs $12^a$ and $13^a$ and the wedge blocks $11^a$, which follower, as in the previous instance, also limits longitudinal movement of the leaf springs $16^a$ positioned between the wedge blocks $11^a$ and serving to urge the same into engagement with the cooperating portions of the casing $3^a$. In the present embodiment of my invention, I do not use any intermediate friction members corresponding to the shoes 18 of the previous embodiment, one reason being the greater angle of inclination of the friction surfaces whereby the gear could not conveniently be designed for using wedge shoes. This form of my invention, however, possesses many of the advantages of the first form. For example, high capacity is secured and normal outward movement of the wedge blocks $11^a$ with respect to the casing $3^a$ is limited by the engagement of the shoulder portions $19^a$ on the casing in corresponding depressions in the wedge blocks $11^a$. Another difference between the present embodiment and the former embodiment of my invention is that apertures 21 are provided between the friction surfaces $7^a$ and $8^a$ thereby permitting the elimination of dirt and the like from the gear. Except as specifically described and apparent from the drawings in connection with the present embodiment of my invention, the construction and operation thereof may be substantially identical with that of the first embodiment.

From the foregoing disclosure, it will be apparent that I have devised a cushioning mechanism admirably adapted for use as a friction draft gear and so constructed that increase in capacity may be effected by increasing the inclination of the friction surfaces, sufficient area for said friction surfaces being retained by providing a plurality of sets of said surfaces. Considering particularly the first embodiment of my invention, it will be seen that wear on the casing is greatly reduced because no motion between the shoes and the casing is effected upon initial movement of the gear and until a substantial compression thereof has been produced. In this way, it will be seen that the casing is only worn when severe shocks are received by the gear and no wear is effected by small normal movement of the gear, the main wear being, therefore, between the wedge blocks and shoes, which members are relatively small and less expensive to replace. By providing a steeper inclination of the friction surfaces on the wedge blocks than on the casing, release movement of said wedge blocks is first effected and said release movement is positive in its action, thereby obviating sticking or other improper gear action.

Having now described my invention, I claim:

1. In a cushioning mechanism, in combination, a casing formed with a plurality of sets of inclined friction surfaces, friction wedge blocks slidable longitudinally in said casing and formed with a plurality of sets of inclined friction surfaces, wedge shoes disposed between the friction surfaces on the casing and those on the blocks and formed with friction surfaces complementary to and engaging those on the casing and wedge blocks, respectively, resilient means resisting movement of the wedge blocks inwardly of the casing and resilient means disposed between the wedge blocks to press the same against the shoes and casing.

2. In a cushioning mechanism, in combination, a casing formed with a plurality of sets of inclined friction surfaces, friction wedge blocks slidable longitudinally with respect to said casing and each formed with a plurality of inclined friction surfaces, wedge shoes disposed between the friction surfaces on the casing and those on the blocks and formed with friction surfaces complementary to and engaging those on the casing and wedge blocks, respectively, the inclination of the friction surfaces on the wedge blocks being greater than that of the friction surfaces on the casing, resilient means resisting movement of the wedge blocks inwardly of the casing and resilient means disposed between the wedge blocks to force the same against the shoes and casing.

3. In a cushioning mechanism, in combination, a casing formed with a double bell mouth providing a plurality of sets of friction surfaces, friction wedge blocks movable longitudinally with respect to said casing and formed with friction surfaces spaced from those on the casing, intermediate friction elements disposed between the friction surfaces on the casing and wedge blocks and formed with friction surfaces complementary to and engaging those on the casing and wedge blocks, respectively, resilient means opposing movement of the wedge blocks inwardly of the casing and resilient means disposed between the wedge blocks to press the same against the intermediate friction means and casing.

4. In a cushioning mechanism, in combination, a casing formed with a double bell mouth providing a plurality of sets of friction surfaces, friction wedges slidable longitudinally with respect to said casing and each formed with a plurality of friction surfaces, intermediate friction elements disposed between the friction surfaces on the casing and those on the wedges and formed with friction surfaces complementary to and engaging those on the casing and wedges, respectively, the friction surfaces on the wedges being inclined with respect to the axis of the mechanism to a greater degree than the friction surfaces on the casing, resilient means resisting movement of the wedges inwardly of the casing and resilient means disposed between said wedges to press the same outwardly against the intermediate elements and the casing.

5. In a cushioning mechanism, in combination, a casing formed with a pair of sets of inclined friction surfaces, wedge blocks slidable longitudinally with respect to said casing and formed with a corresponding pair of sets of inclined surfaces, shoes disposed between the friction surfaces on the casing and blocks and formed with friction surfaces complementary to and normally engaging those on the casing and wedge blocks, respectively, coil spring means resisting movement of the wedge blocks inwardly of the casing and leaf spring means disposed between the wedge blocks and acting to force the same against the shoes and casing.

6. In a cushioning mechanism, in combination, a casing formed with a pair of sets of inclined friction surfaces, friction wedge blocks movable longitudinally with respect to said casing and each formed with a pair of inclined friction surfaces, shoes disposed between the friction surfaces on the casing and those on the blocks and formed with friction surfaces complementary to and engaging those on the casing and wedge blocks, respectively, the friction surfaces on the wedge blocks being disposed at a greater angle to the axis of the mechanism than the friction surfaces on the casing, coil spring means resisting inward movement of the wedge blocks with respect to the casing and leaf spring means positioned between the wedge blocks to urge the same against the shoes and the casing.

7. In a cushioning mechanism, in combination, a friction barrel formed with a plurality of sets of inclined friction surfaces, wedge blocks slidable longitudinally with respect to said barrel and formed with a plurality of sets of similarly inclined friction surfaces, shoes disposed between said friction surfaces on the barrel and those on the blocks and formed with friction surfaces complementary to and engaging those on the barrel and wedge blocks, respectively, a greater frictional area being provided by the plurality of sets of inclined friction surfaces on the frictional elements than if only one set were used, resilient means positioned in said barrel and engaging the wedge blocks to resist inward movement thereof and resilient means positioned between the wedge blocks to urge the same toward the shoes and the friction surfaces on the barrel.

8. In a cushioning mechanism, in combination, a barrel formed with a plurality of sets of inclined friction surfaces adjacent the mouth thereof, friction wedge blocks slidable longitudinally and laterally with respect to said barrel and each formed with a corresponding number of inclined friction surfaces, wedge shoes disposed between the friction surfaces on the barrel and those on the blocks and formed with friction surfaces complementary to and engaging those on the barrel and wedge blocks, respectively, the inclination of the friction surfaces on the wedge blocks being greater than that of the friction surfaces on the barrel to facilitate release of the mechanism, resilient means resisting movement of the wedge blocks inwardly of the barrel and resilient means disposed between the wedge blocks to press the same toward the shoes and the friction surfaces on the barrel.

9. In a friction shock absorbing mechanism, the combination with a spring cage having a shell at the outer end thereof provided with opposed interior wedge faces; of wedge blocks co-operating with the wedge faces of the shell; pressure transmitting elements interposed between the wedge blocks; means for limiting the outward movement of said elements, the front ends of said blocks being staggered with respect to the pressure transmitting elements; whereby the actuating force is delivered to said blocks and elements at different stages in operation of the mechanism; spring means opposing inward movement of said pressure transmitting elements and blocks; and means for maintaining the pressure transmitting elements in contact with the wedge blocks.

10. In a friction shock absorbing mechanism, the combination with a spring cage having a shell at the outer end thereof provided with opposed interior wedge faces of a main follower, said follower and shell being movable relatively toward and away from each other; wedge blocks co-operating with the wedge faces of the shell; pressure transmitting elements interposed between the wedge blocks; means for limiting outward movement of the wedge blocks and pressure transmitting elements, the front ends of said blocks being staggered with respect to the pressure transmitting elements, whereby the actuating force from the main follower is delivered to said blocks and elements at different stages in the operation of the mechanism; spring means opposing inward movement of said pressure transmitting elements and blocks; and means for maintaining the pressure transmitting elements in contact with the wedge blocks.

11. In a friction shock absorbing mechanism, the combination with a spring cage having a shell at the forward end thereof provided with opposed interior wedge faces; wedge shoes co-operating with the shell wedge faces; means on said shoes co-operating with the shell to limit outward movement of the shoes; a spring resistance; pressure transmitting elements between said shoes and co-operating with the spring resistance, said elements having notches providing shoulders normally in engagement with the adjacent shoes to limit outward movement thereof, said pressure transmitting elements normally extending beyond the outer ends of the shoes to initially receive the actuating pressure, said elements being movable relatively to the shoes longitudinally thereof until the shoes are engaged and moved inwardly of the shell; and means for forcing said pressure transmitting elements apart and maintaining the same in engagement with the wedge blocks.

12. In a friction shock absorbing mechanism, the combination with a main follower; of a spring cage having a friction shell connected to the outer end thereof, the shell being provided with interior inwardly converging wedge faces, said cage and follower being relatively movable toward and from each other; wedge blocks co-operating with the wedge faces of the shell, said blocks having inner friction surfaces; pressure transmitting elements slidable longitudinally on the surfaces of the wedge blocks, said pressure transmitting elements extending beyond the outer ends of the blocks into engagement with the main follower, and having portions interlocking with said blocks for limiting outward movement; spring resistance elements disposed within the spring cage; and a spring follower interposed between the inner ends of the pressure transmitting elements and the spring resistance.

13. In a friction shock absorbing mechanism, in combination with a friction shell having inwardly converging friction faces; a plurality of wedge members, spring means for urging said members apart and effecting release of the mechanism, a spring follower normally disposed in said shell inwardly of said wedge members, said members being interposed between the converging faces of the shell and the spring follower, and arranged in pairs, one member of each pair being movable with respect to the other and extending outwardly beyond the other member to provide for limited relative movement of the same.

In testimony whereof I affix my signature.
DONALD S. BARROWS.